United States Patent
Mugeraya et al.

(10) Patent No.: US 12,134,478 B2
(45) Date of Patent: Nov. 5, 2024

(54) CONTROL SYSTEMS AND METHODS FOR INFLATABLE EVACUATION SLIDE

(71) Applicant: GOODRICH CORPORATION, Charlotte, NC (US)

(72) Inventors: Bhavik Mugeraya, Bangalore (IN); Poly Puthur John, Trivandrum (IN); Srijith Purushothaman, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 176 days.

(21) Appl. No.: 17/590,454

(22) Filed: Feb. 1, 2022

(65) Prior Publication Data
US 2023/0166852 A1    Jun. 1, 2023

(30) Foreign Application Priority Data
Nov. 30, 2021  (IN) .............................. 202141055482

(51) Int. Cl.
*B64D 25/14*    (2006.01)
*G05D 16/20*    (2006.01)

(52) U.S. Cl.
CPC ......... *B64D 25/14* (2013.01); *G05D 16/2013* (2013.01)

(58) Field of Classification Search
None
See application file for complete search history.

(56) References Cited

U.S. PATENT DOCUMENTS

| | | | | |
|---|---|---|---|---|
| 3,232,309 A | * | 2/1966 | Eichenauer | B60S 5/046 137/624.13 |
| 3,460,746 A | * | 8/1969 | Forsythe | F04F 5/466 417/174 |
| 4,945,588 A | * | 8/1990 | Cassidy | A47C 27/082 5/713 |
| 5,052,894 A | | 10/1991 | Rimington | |
| 6,860,205 B2 | | 3/2005 | Baker et al. | |
| 9,637,210 B2 | | 5/2017 | Thomson | |
| 9,914,544 B2 | | 3/2018 | Hartman et al. | |
| 2016/0107733 A1 | | 4/2016 | Thomson | |
| 2020/0094976 A1 | | 3/2020 | John et al. | |

FOREIGN PATENT DOCUMENTS

EP        1434016 A1 *  6/2004  ............. F23N 5/242

OTHER PUBLICATIONS

European Patent Office, European Search Report dated Mar. 17, 2023 in Application No. 22210595.9.

* cited by examiner

*Primary Examiner* — William R Harp
(74) *Attorney, Agent, or Firm* — SNELL & WILMER L.L.P.

(57) ABSTRACT

An inflation control system for an inflatable device may comprise: a compressed fluid source; a solenoid valve connected to the compressed fluid source and configured to control a flow of gas to the inflatable device; and a control circuit comprising a power source, a pressure switch, and an electrical switch, the control circuit configured to energize, via the power source, the solenoid valve in response to both the pressure switch and the electrical switch being in a closed state, the pressure switch configured to open and de-energize the solenoid valve in response to being exposed to a pressure at or exceeding a pressure threshold.

20 Claims, 4 Drawing Sheets

FIG.5

CONTROL SYSTEMS AND METHODS FOR INFLATABLE EVACUATION SLIDE

CROSS-REFERENCE TO RELATED APPLICATIONS

This application is a non-provisional of, and claims priority to, and the benefit of India Provisional Application No. 202141055482 with DAS Code 1F9E, entitled "CONTROL SYSTEMS AND METHODS FOR INFLATABLE EVACUATION SLIDE," filed on Nov. 30, 2021, which is hereby incorporated by reference in its entirety.

FIELD

The present disclosure relates generally to inflatable evacuation systems and, more particularly, to methods and apparatus used to control inflation of such inflatable evacuation systems.

BACKGROUND

Inflatable evacuation systems may be found on various structures, including aircraft, boats, offshore drilling platforms and the like. The systems are typically equipped with an inflatable or an inflatable device, such as, for example, an inflatable slide or an inflatable raft, configured to facilitate rapid evacuation of persons in the event of an emergency. Such inflatables are typically stored in an uninflated condition on the structure in a location readily accessible for deployment. For example, an evacuation slide for a commercial aircraft is stored in an uninflated condition in a case or compartment located proximate an emergency exit.

Systems used to inflate evacuation slides typically employ a gas stored within a cylinder or tank at high pressure, which is discharged into the evacuation slide (or into an inflatable tube comprised within the evacuation slide) within a specific time period. This may be accomplished, for example, by opening a main inflation valve that connects the high-pressure gas to the inflatable tube. Since fast inflation times for an evacuation slide or raft are important, most inflation systems will have excess gas in the storage cylinder or tank to ensure complete inflation and to adjust for variations in ambient temperature and gas supply lines. An evacuation slide is also typically provided with one or more pressure relief valves to vent the excess gas after the evacuation slide or inflatable tube is charged to the set pressure of the pressure relief valve.

During an emergency or similar event, the evacuation slide is typically deployed in response to an action taken by a passenger or a crew member. Upon deployment, the high-pressure gas is forced into the evacuation slide or the inflatable tube causing inflation of the slide to occur. Amount of inflation gas to achieve a desired inflatable pressure varies with ambient temperature. More inflation gas is desired at lower ambient temperatures and less gas desired at higher temperatures due to changes in densities of gasses with variations in temperature. The amount of gas stored in the pressurized cylinder is often based on a worst-case situation. For larger inflatables, additional gas may be stored to account for the variations in aspirator efficiencies. In any case, excess gas flows to inflatable and is typically vented through pressure relief valve (PRV) attached on the inflatable.

SUMMARY

An inflation control system for an inflatable device is disclosed herein. The inflation control system may comprise: a compressed fluid source; a solenoid valve connected to the compressed fluid source and configured to control a flow of gas to the inflatable device; and a control circuit comprising a power source, a pressure switch, and an electrical switch, the control circuit configured to energize, via the power source, the solenoid valve in response to both the pressure switch and the electrical switch being in a closed state, the pressure switch configured to open and de-energize the solenoid valve in response to being exposed to a pressure at or exceeding a pressure threshold.

In various embodiments, the pressure switch is a mechanical pressure switch. The pressure switch may further comprise a controller, a pressure sensor, and a micro-switch. The controller may be configured to: determine whether the pressure is at or exceeding the pressure threshold, and command the micro-switch to open in response to the pressure being at or exceeding the pressure threshold. The electrical switch may be configured to close in response to receiving a trigger to begin an inflation process. The inflation control system may further comprise a fluid conduit disposed between the solenoid valve and the inflatable device, the fluid conduit coupled to a junction in fluid communication with the pressure switch and the inflatable device. The inflation control system may further comprise an aspirator fluidly connected between the solenoid valve and the inflatable device.

An inflation control system for an inflatable device is disclosed herein. The inflation control system may comprise: a compressor; a motor; a shaft coupled to the motor and the compressor; a control circuit comprising a power source, a pressure switch, and an electrical switch, the control circuit configured to power, via the power source, the motor in response to both the pressure switch and the electrical switch being in a closed state, the pressure switch configured to open and in response to being exposed to a pressure at or exceeding a pressure threshold; and a controller configured to reduce the power supplied to the motor in response to the pressure switch being open.

In various embodiments, the pressure switch is a mechanical pressure switch. The compressor may comprise a fluid inlet configured to receive an ambient air. The electrical switch may be configured to close in response to receiving a trigger to begin an inflation process. An electrical circuit between the power source and the motor may be completed in response to the electrical switch being closed. The pressure switch may provide a signal to the controller in response to being in the closed state. The controller may be configured to command the motor to reduce a motor speed in response to no longer receiving the signal.

An evacuation system for an aircraft is disclosed herein. The evacuation system may comprise: an inflatable tube; and a control circuit comprising a power source, a pressure switch, and an electrical switch, the evacuation system configured to inflate the inflatable tube in response to both the pressure switch and the electrical switch being in a closed state, the pressure switch configured to open in response to being exposed to a pressure at or exceeding a pressure threshold, the evacuation system configured to reduce a pressure output to the inflatable tube in response to the pressure switch being open.

In various embodiments, the evacuation system may further comprise a compressed fluid source and a solenoid valve, wherein the solenoid valve is disposed fluidly between the compressed fluid source and the inflatable tube, and wherein the solenoid valve is configured to transition from a second closed state to an open state in response to being energized. The solenoid valve may be energized in response to both the pressure switch and the electrical switch being in the closed state. The solenoid valve may be configured to be de-energized in response to the pressure switch being open. The evacuation system may further comprise a motor coupled to a compressor via a shaft, wherein the motor is configured to power the compressor in response to the pressure switch and the electrical switch being in the closed state. The evacuation system may further comprise a controller configured to receive a signal from the pressure switch in response to the pressure switch being in the closed state, wherein the controller is configured to command the motor to reduce the power in response to no longer receiving the signal.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option.

Surface lines may be used throughout the figures to denote different parts but not necessarily to denote the same or different materials. Throughout the present disclosure, like reference numbers denote like elements. Accordingly, elements with like element numbering may be shown in the figures, but may not necessarily be repeated herein for the sake of clarity.

The systems and methods disclosed herein may find particular use in connection with aircraft evacuation slides. However, various aspects of the disclosed systems and methods may be adapted for performance in a variety of other inflatable assemblies, for example, inflatable raft assemblies, and/or any other assemblies having inflatable structures. As such, numerous applications of the present disclosure may be realized.

Figure 1:
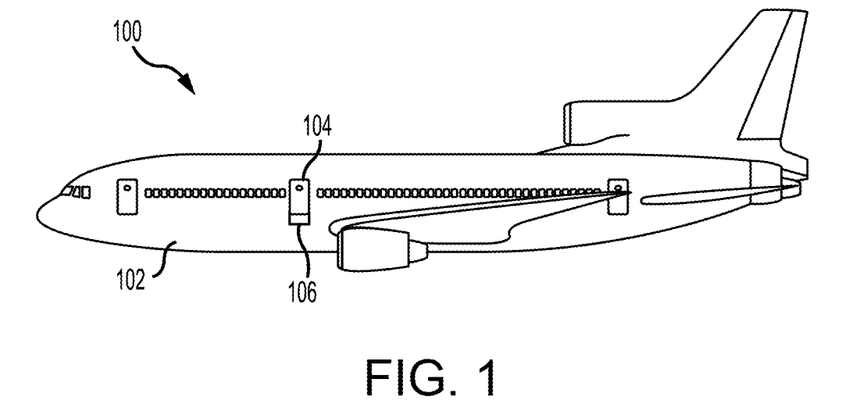
FIG. 1 illustrates an aircraft having an evacuation assembly, in accordance with various embodiments.

Referring now to FIG. 1, an aircraft 100 is shown. Aircraft 100 may include a fuselage 102 having plurality of exit doors, including an exit door 104. Aircraft 100 may include one or more evacuation systems positioned near a corresponding exit door. For example, aircraft 100 includes an evacuation system 106 positioned near exit door 104. In the event of an emergency, exit door 104 may be opened by a passenger or crew member of aircraft 100. In various embodiments, evacuation system 106 may deploy in response to exit door 104 being opened. It is contemplated and understood that evacuation system 106 may deploy in response to other actions taken by a passenger or crew member such as depression of a button, actuation of a lever, or the like.

Figure 2:
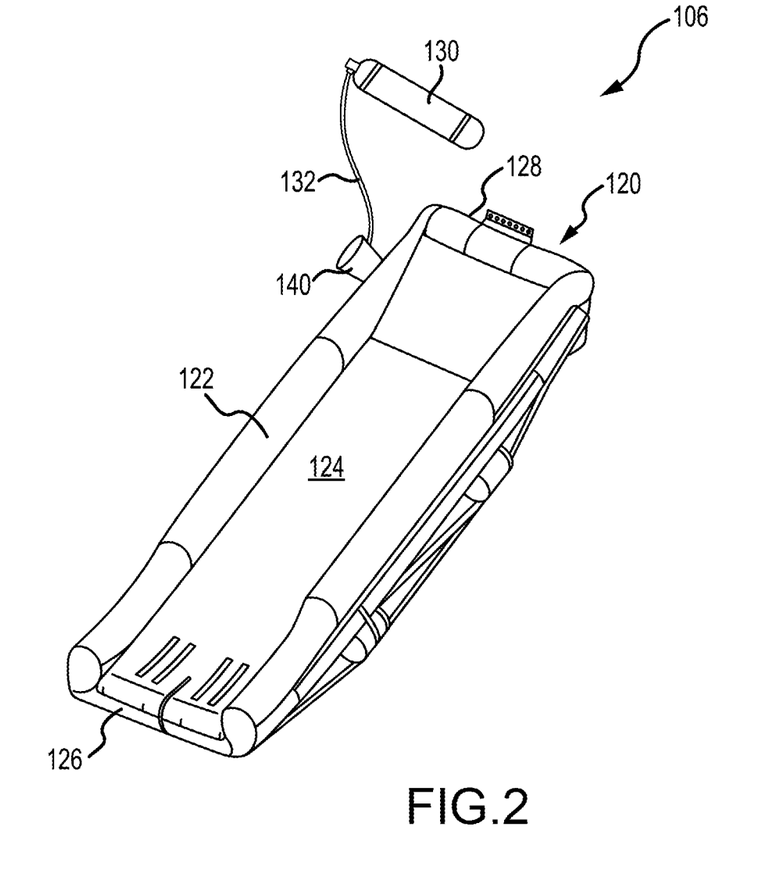
FIG. 2 illustrates an evacuation slide in a deployed position, in accordance with various embodiments.

With reference to FIG. 2, evacuation system 106 is illustrated with the evacuation slide in an inflated or "deployed" position. In accordance with various embodiments, evacuation system 106 includes an evacuation slide 120 and a compressed fluid source 130 configured to deliver a pressurized gas to inflate evacuation slide 120. During deployment, an inflatable tube 122 (or a plurality of inflatable tubes) of evacuation slide 120 is inflated using pressurized gas from compressed fluid source 130. Evacuation slide 120 may comprise a sliding surface 124 secured to the inflatable tube 122 and configured for sliding passenger egress from the emergency exit door 104 of the aircraft 100, with momentary reference to FIG. 1, to a ground surface in the event of an evacuation on land or to a water surface in the event of an evacuation on water. Evacuation slide 120 includes a toe end 126 and a head end 128 opposite toe end 126. Head end 128 may be coupled to an aircraft structure (e.g., fuselage 102 in FIG. 1). Sliding surface 124 extends from head end 128 to toe end 126. Evacuation slide 120 is illustrated as a single lane slide. However, evacuation slide 120 may comprise any number of lanes.

Compressed fluid source 130 is fluidly coupled to evacuation slide 120. For example, compressed fluid source 130 may be fluidly coupled to inflatable tube 122 via a hose, or conduit, 132. In various embodiments, evacuation system 106 may include an aspirator 140 fluidly coupled between compressed fluid source 130 and evacuation slide 120. Aspirator 140 is configured to entrain ambient air with gas output from compressed fluid source 130. For example, in response to deployment of evacuation slide 120, the gas from compressed fluid source 130 flows into aspirator 140 and causes aspirator 140 to draw in ambient air from the environment. The combination of gas flow from compressed fluid source 130 and the environmental gas is then directed into evacuation slide 120, thereby inflating inflatable tube 122.

Figure 3:
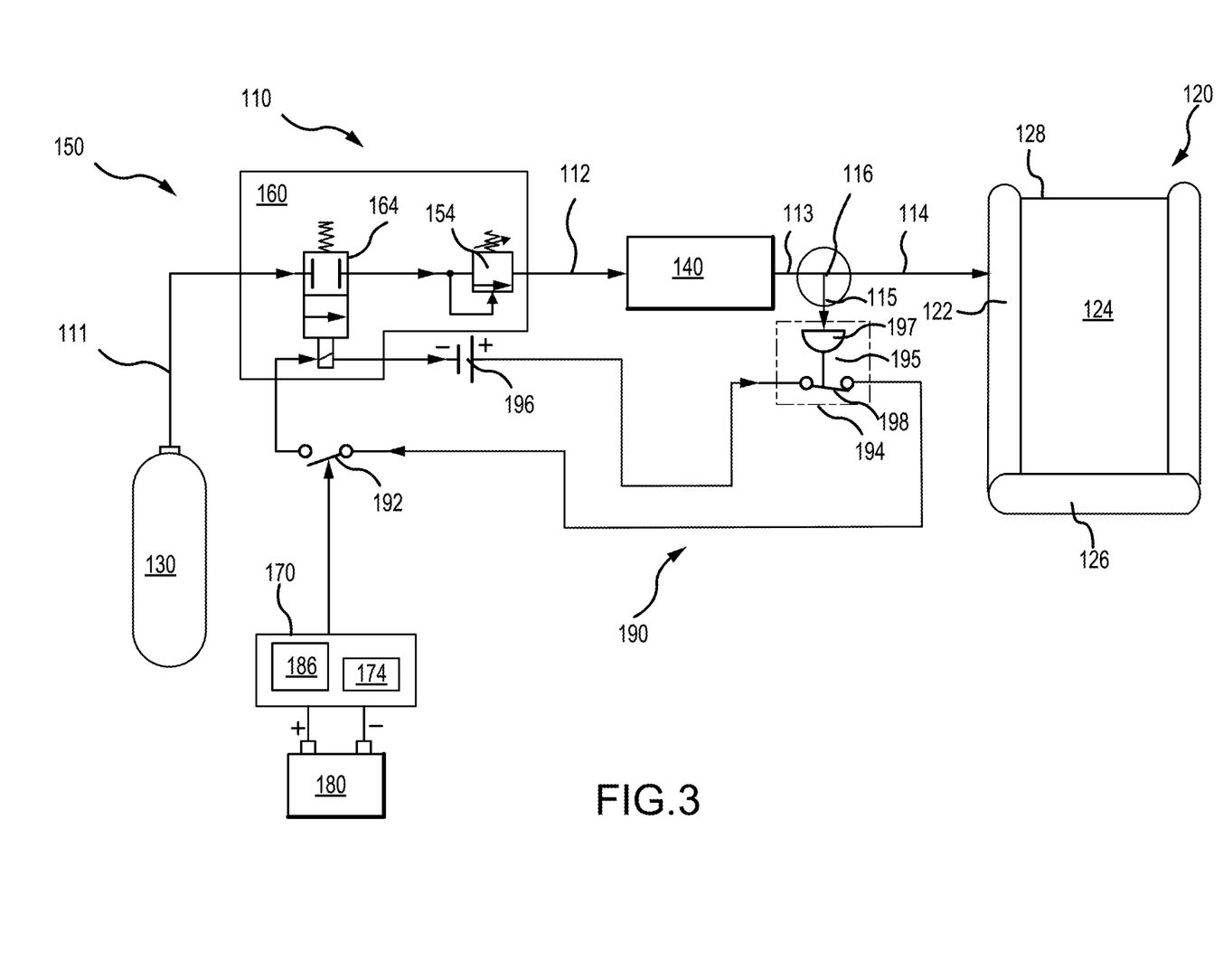
FIG. 3 illustrates a schematic of an inflation control system, in accordance with various embodiments.

Referring now to FIG. 3, an inflation control system 150 for controlling inflation of evacuation slide 120 is illustrated. Inflation control system 150 an inflation control circuit 190.

The inflation control circuit 190 includes an electrical switch 192, a pressure switch 194, a control valve 164, and a power source 196.

As described further herein, the electrical switch 192 transitions from an open position to a closed position in order to initiate inflation of the evacuation slide 120. In various embodiments, the pressure switch 194 may modulate between an open position and closed position during inflation of the evacuation slide 120 as described further herein. In response to the electrical switch 192 and the pressure switch 194 both being closed, an electrical circuit is completed between the control valve 164 and the power source 196. Thus, the control valve 164 may be a nominally closed solenoid valve. In this regard, the control valve 164 is configured to open in response to receiving an electrical current from the power source 196 due to an electrical circuit being completed as described further herein.

Inflation control system 150 further comprises a valve module 160, which includes the control valve 164 and a pressure regulator 154, a compressed fluid source 130, which is filled with a high-pressure gas (or, in various embodiments, a gas generator configured to generate a high-pressure gas), an aspirator 140, a controller 170, and a power source 180, such as, for example, a battery or charged capacitor. Although illustrated as comprising the controller 170 and the power source 180, the present disclosure is not limited in this regard. For example, the electrical switch 192 may be activated mechanically (e.g., via actuation of a mechanical trigger configured for activation via moving, pressing, releasing, or touching) or activated electronically (e.g., via a command signal from controller 170 powered by power source 180).

In various embodiments, the controller 170 may include a general-purpose processor, a digital signal processor (DSP), an application specific integrated circuit (ASIC), a field programmable gate array (FPGA) or some other programmable logic device, discrete gate or transistor logic, discrete hardware components, or any combination thereof. A tangible, non-transitory computer-readable storage medium 174 may be in communication with controller 170. Storage medium 174 may comprise any tangible, non-transitory computer-readable storage medium known in the art. The storage medium 174 has instructions stored thereon that, in response to execution by controller 170, cause controller 170 to perform operations related to controlling the inflation of evacuation slide 120 (e.g., electronically activating electrical switch 192 to transition from an open position to a closed position).

In various embodiments, the power source 180 is a source configured to power the electrical switch 192 only. In this regard, the power source 180 may be used to activate (i.e., close via an electronic input) electrical switch 192 to initiate an inflation process, in accordance with various embodiments. In various embodiments, the power source 196 is a dedicate source of power for the control valve 164. In this regard, in response to switches 192, 194 both being closed, the power source 196 is in electrical communication with the control valve 164.

To provide a dedicated source of direct current power, the power sources 180, 196 may comprise, for example, a lithium-ion battery or an ultracapacitor, each configured to store energy at a high density for controlling the rapid sequence of events that occur during an inflation process of the evacuation slide 120.

In various embodiments, a plumbing system 110 comprises fluid conduits 111, 112, 113, 114, 115. The fluid conduit 111 extends from the compressed fluid source to the valve module 160. Fluid conduit 112 extends from the valve module 160 to the aspirator 140. Fluid conduit 113 extends from the aspirator 140 to a fluid junction 116 (e.g., a three-way elbow, three-way tee, a three-way Y-fitting, a three-way L-fitting, etc.). Fluid conduit 114 extends from the fluid junction 116 to the evacuation slide 120, and fluid conduit 115 extends from the fluid junction 116 to the pressure switch 194. In various embodiments, the mechanical pressure switch is configured to transition from a closed position to an open position in response to being exposed to a pressure that exceeds a pressure threshold. The pressure threshold may be determined based on a pressure profile during inflation as described further herein. In this regard, the pressure switch 194 may modulate between an open and closed position during inflation, resulting in opening and closing of the control valve 164, and thus modulating a pressure of the fluid being supplied from the compressed fluid source 130, in accordance with various embodiments.

In various embodiments, the pressure switch 194 comprises a mechanical pressure switch 195. The mechanical pressure switch 195 comprise a pressure sensing element 197 (e.g., a membrane or piston) and a micro-switch 198. When the pressure reaches, or exceeds the pressure threshold, the micro switch contact snaps open to open the inflation control circuit 190. The mechanical pressure switch 195 may be low cost compared to typical inflation control systems, in accordance with various embodiments. The mechanical pressure switch 195 may also be reliable and long lasting, in accordance with various embodiments. In various embodiments, the mechanical pressure switch 195 may be configured to passively control a pressure of fluid being dispensed in the evacuation slide 120. In this regard, a pressure relief valve may essentially be eliminated, as well as sensors and/or controllers, in accordance with various embodiments.

In various embodiments, the pressure switch 194 may comprise an electronic pressure switch 294. For example, with reference now to FIG. 4, the inflation control system 150 comprising a pressure switch 194 that is an electronic pressure switch 294 is illustrated, in accordance with various embodiments. The electronic pressure switch 294 may comprise a controller 295, a memory 296, a pressure sensor 297, and the micro-switch 198.

Figure 4:
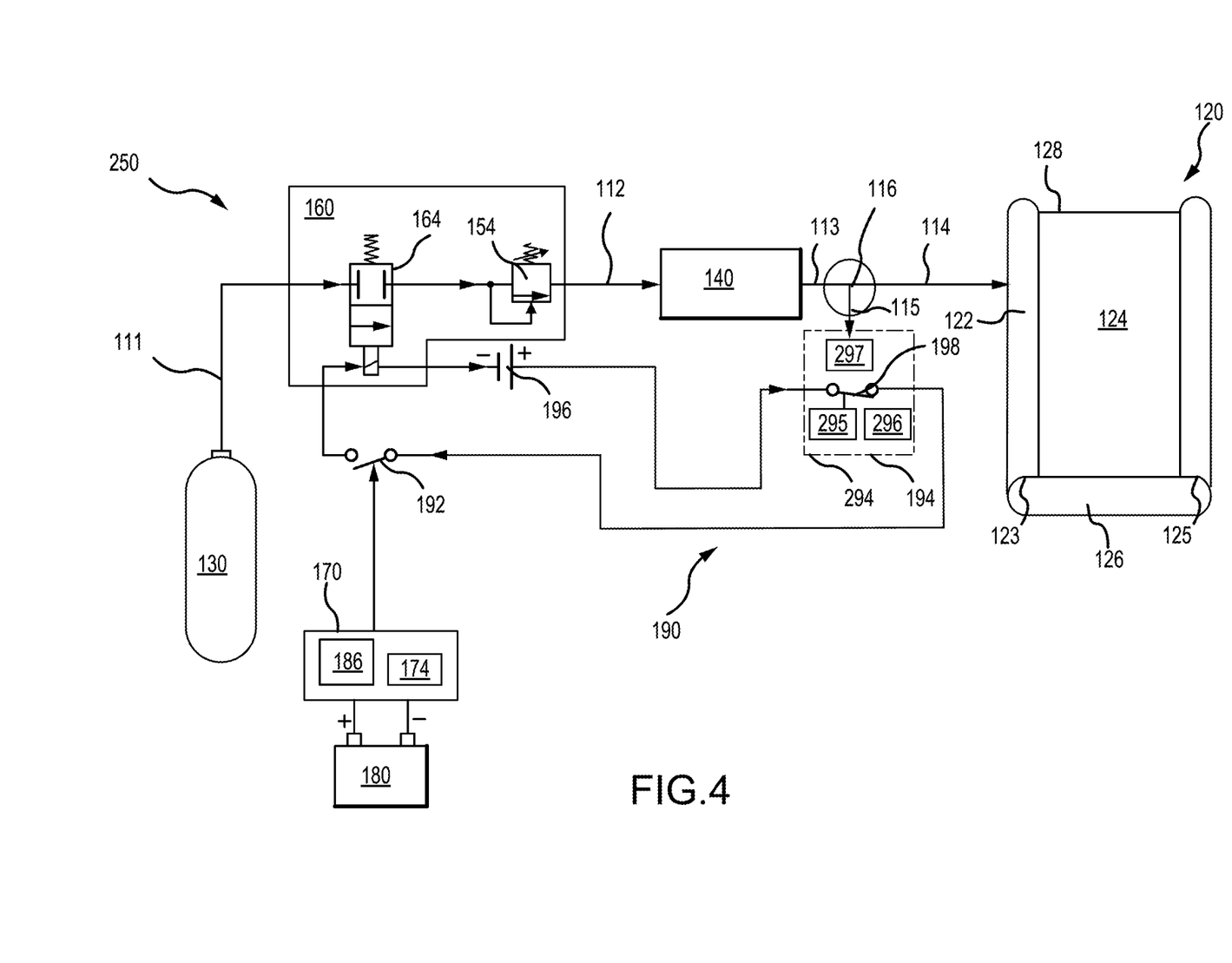
FIG. 4 illustrates a schematic of an inflation control system, in accordance with various embodiments.

In various embodiments, controller 295 may comprise a microcontroller integrated within the electronic pressure switch 294. In various embodiments, the controller 295 may comprise a processor. In various embodiments, controller 295 may be implemented in a single processor. In various embodiments, controller 295 may be implemented as and may include one or more processors and/or one or more tangible, non-transitory memories (e.g., memory 296) and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. Controller 295 may comprise a processor configured to implement various logical operations in response to execution of instructions, for example, instructions stored on a non-transitory, tangible, computer-readable medium configured to communicate with controller 295.

In various embodiments, the controller 295 is in electronic (e.g., wireless or wired) communication with the memory 296, the pressure sensor 297, and the micro-switch 198. In this regard, the controller 295 may be configured to receive pressure data from the pressure sensor 297 and command the micro-switch to transition from a closed position to an open position in response to the pressure data exceeding the pressure threshold described previously herein. In various embodiments, a transient time period may exist during inflation where pressure may exceed the pressure threshold. For example, the evacuation slide 120 may comprise restraints 123 between adjacent inflatable tubes 122 configured to break during inflation of the evacuation slide 120. In this regard, pressure in fluid conduit 115 prior to breaking of the restraints 123 may exceed the desired pressure threshold for the electronic pressure switch 294. In this regard, the controller 295 may be configured to maintain the micro-switch 198 in a closed position during the transient time period described previously herein to ensure breaking of restraints 123 and proper inflation of the evacuation slide 120, in accordance with various embodiments. Thus, when pressure during inflation exceeding the desired pressure threshold prior to restraints 123 breaking, the electronic pressure switch 294 may be advantageous. In various embodiments, when pressure during inflation is below the desired pressure threshold, the mechanical pressure switch 195 from FIG. 3 may be advantageous, in accordance with various embodiments.

Although illustrated as utilizing a compressed fluid source 130, the present disclosure is not limited in this regard. For example, with reference now to FIG. 5, ambient air may be utilized for inflation of evacuation slide 120 via a motor 530 and compressor 540, in accordance with various embodiments. In various embodiments, the motor 530 may be coupled to the compressor 540 via a shaft 535. The compressor 540 may comprise a fluid inlet 542 configured to receive ambient air from an external source (e.g., external to an aircraft or external to the inflation control system 550.

Figure 5:
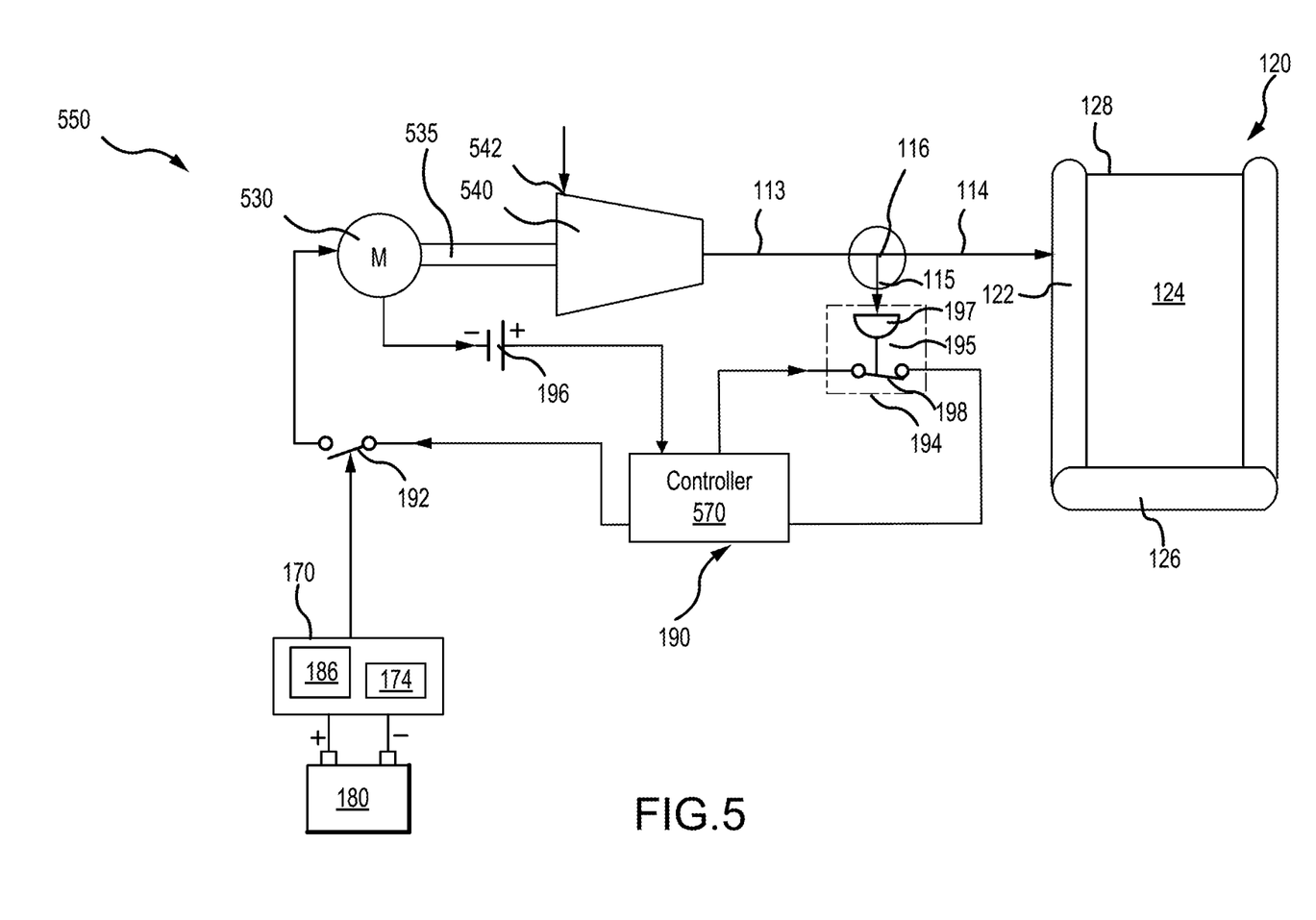
FIG. 5 illustrates a schematic of an inflation control system, in accordance with various embodiments.

In various embodiments, the inflation control system 550 comprises a controller 570. The controller 570 may be in electronic (e.g., wireless or wired) communication with the power source 196, the electrical switch 192, and the pressure switch 194. In various embodiments, in response to the pressure switch 194 transitioning from an open state to a closed state during inflation (i.e., while the electrical switch 192 is in a closed state), a signal from the pressure switch 194 to the controller 570 will no longer be received by the controller 570. In response to the controller 570 losing the signal from the pressure switch 194 transitioning from a closed state to an open state, the controller 570 may command the motor to reduce a power output or shut off a power output, in accordance with various embodiments. In this regard, the pressure output to the evacuation slide 120 may be controlled, in accordance with various embodiments.

Based on the ambient temperature data and the elastic stretch (or pressure) data, the duration of time the main pneumatic valve 162 needs to be open to achieve the desired inflation pressure at various temperatures may be determined. In this regard, the open-time versus temperature database 186 is developed and embedded into the controller 170 based on testing performed using ground-test inflation control system 250. The open-time versus temperature database 186 will generally include information defining a duration of time the main pneumatic valve 162 needs to open to achieve a desired inflation pressure at a given ambient temperature. In other words, the open-time versus temperature database 186 will enable the controller 170 to determine the open-valve time based on the ambient temperature measurement received from a temperature sensor.

The inflation control system described above provides several benefits over existing systems. Pressure switch 194 may be reliable with a long operational life (e.g., one million cycles or greater), in accordance with various embodiments. In various embodiments, mechanical pressure switch 195 may utilize no electric power during operation. Pressure switch 194 is light weight (e.g., 20 to 30 grams) and may facilitate removal of various components (e.g., sensors, controllers, or the like), in accordance with various embodiments. The inflation control systems disclosed herein may result in a weight reduction compared to typical systems, in accordance with various embodiments.

In various embodiments, the inflation control system disclosed herein may be utilized in various inflation systems which use repeatedly operating electric inflators, such as solenoid valves, pneumatic valves, electric motors, or the like. In various embodiments, the inflation control systems disclosed herein may avoid usage of feedback-controlled inflation systems, sensors, real-time data for controllers, etc. Stretch sensors and mounting joints of typical inflation systems involve higher cost than inflation control systems disclosed herein, in accordance with various embodiments. In various embodiments, the inflation control system disclose herein may improve packing of an inflation device by reducing safety procedures typical of sensors for typical inflation control systems.

In various embodiments, the inflation control system 150 disclosed herein may provide a passively controlled inflation system. In this regard, a complexity of the inflation control system 150 may be less than a typical inflation control system, in accordance with various embodiments.

In various embodiments, the inflation control systems disclosed herein may reduce processing and maintenance efforts due to elimination of feedback controls, long electrical wire routing, or the like associated with typical inflation control systems. In various embodiments, pressure switch 194 disclosed herein may be easily replaceable providing enhanced maintenance capability relative to typical inflation control systems.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed:

1. An inflation control system for an inflatable device, comprising:
    a compressed fluid source;
    a solenoid valve connected to the compressed fluid source and configured to control a flow of gas from the compressed fluid source to the inflatable device;
    an aspirator fluidly connected between the solenoid valve and the inflatable device, the aspirator configured to entrain ambient air with gas output from the compressed fluid source; and
    a control circuit comprising a power source, a pressure switch, an electrical switch, a first electrical line extending from the power source to the pressure switch, a second electrical line extending from the pressure switch to the electrical switch, a third electrical line extending from the electrical switch to the solenoid valve, and a fourth electrical line extending from the solenoid valve to the power source, the control circuit configured to energize, via the power source, the solenoid valve in response to both the pressure switch and the electrical switch being in a closed state, the pressure switch configured to open and de-energize the solenoid valve in response to being exposed to a pressure at or exceeding a pressure threshold.

2. The inflation control system of claim 1, wherein the pressure switch is a mechanical pressure switch.

3. The inflation control system of claim 1, wherein the pressure switch further comprises a controller, a pressure sensor, and a micro-switch.

4. The inflation control system of claim 3, wherein the controller is configured to:
    determine whether the pressure is at or exceeding the pressure threshold, and
    command the micro-switch to open in response to the pressure being at or exceeding the pressure threshold.

5. The inflation control system of claim 1, wherein the electrical switch is configured to close in response to receiving a trigger to begin an inflation process.

6. The inflation control system of claim 1, further comprising a fluid conduit disposed between the solenoid valve and the inflatable device, the fluid conduit coupled to a junction in fluid communication with the pressure switch and the inflatable device.

7. An inflation control system for an inflatable device, comprising:
    a compressor;
    a motor;
    a shaft coupled to the motor and the compressor;
    a control circuit comprising a controller, a power source, a pressure switch, an electrical switch, the control circuit comprising a first electrical circuit extending from the controller to the pressure switch and back to the controller, the control circuit further comprising a second electrical circuit extending from the controller to the electrical switch, to the motor, and back to the controller, the second electrical circuit comprising the power source, the control circuit configured to power, via the power source, the motor in response to both the pressure switch and the electrical switch being in a closed state, wherein the controller is configured to;
        receive a signal in response to the pressure switch being in the closed state, and
        reduce the power supplied to the motor in response to the pressure switch being open and no longer receiving the signal.

8. The inflation control system of claim 7, wherein the pressure switch is a mechanical pressure switch.

9. The inflation control system of claim 8, wherein the electrical switch is configured to close in response to receiving a trigger to begin an inflation process.

10. The inflation control system of claim 8, wherein an electrical circuit between the power source and the motor is completed in response to the electrical switch being closed.

11. The inflation control system of claim 7, wherein the compressor comprises a fluid inlet configured to receive an ambient air.

12. The inflation control system of claim 7, wherein the pressure switch provides the signal to the controller in response to being in the closed state.

13. The inflation control system of claim 12, wherein the controller is configured to command the motor to reduce a motor speed in response to no longer receiving the signal.

14. An evacuation system for an aircraft, comprising:
    an evacuation slide comprising an inflatable tube, the evacuation slide comprising: a sliding surface extending from a head end to a toe end, and one or more slide lanes in an inflated configuration; and
    a control circuit comprising a power source, a pressure switch, and an electrical switch, the evacuation system configured to inflate the inflatable tube in response to both the pressure switch and the electrical switch being in a closed state, the pressure switch configured to open in response to being exposed to a pressure of a fluid at or exceeding a pressure threshold, the evacuation system configured to reduce a pressure output to the inflatable tube in response to the pressure switch being open, wherein:
        the pressure switch is a mechanical pressure switch comprising a micro-switch and one of a membrane or a piston, and
        the mechanical pressure switch is configured to passively control the pressure of the fluid being dispensed in the inflatable tube.

15. The evacuation system of claim 14, further comprising a compressed fluid source and a solenoid valve, wherein the solenoid valve is disposed fluidly between the compressed fluid source and the inflatable tube, and wherein the solenoid valve is configured to transition from a second closed state to an open state in response to being energized.

16. The evacuation system of claim 15, wherein the solenoid valve is energized in response to both the pressure switch and the electrical switch being in the closed state.

17. The evacuation system of claim 16, wherein the solenoid valve is configured to be de-energized in response to the pressure switch being open.

18. The evacuation system of claim 14, further comprising a motor coupled to a compressor via a shaft, wherein the motor is configured to power the compressor in response to the pressure switch and the electrical switch being in the closed state.

19. The evacuation system of claim 18, further comprising a controller configured to receive a signal from the pressure switch in response to the pressure switch being in the closed state, wherein the controller is configured to command the motor to reduce the power in response to no longer receiving the signal.

20. The evacuation system of claim 14, further comprising:
- a valve module comprising a solenoid valve and a pressure regulator;
- a compressed fluid source filled with a pressurized gas, the compressed fluid source configured to be fluidly coupled to the valve module during inflation of the evacuation slide; and
- an aspirator fluidly connected between the valve module and the inflatable tube, the aspirator configured to entrain ambient air with gas output from the compressed fluid source.

* * * * *